United States Patent

[11] 3,602,260

| [72] | Inventors | Raymond H. Boehm;<br>George L. Boehm, both of Racine, Wis. |
|------|-----------|---|
| [21] | Appl. No. | 785,148 |
| [22] | Filed | Dec. 19, 1968 |
| [45] | Patented | Aug. 31, 1971 |
| [73] | Assignee | Crown Industries, Inc.<br>Racine, Wis. |

[54] SOLENOID VALVE
16 Claims, 4 Drawing Figs.

[52] U.S. Cl. ................................................. 137/596.17,
137/613, 251/138
[51] Int. Cl. ................................................. F16k 31/02
[50] Field of Search .......................................... 137/596,
596.17, 625.25, 636.1, 112; 251/138, 243, 261,
260, 334, 347, 332, 368, 363, 359, 251, 30

[56] References Cited
UNITED STATES PATENTS

| Re.9,058 | 1/1880 | Hammer | 137/112 |
| 614,798 | 11/1898 | Dodge | 137/636.1 |
| 1,228,453 | 6/1917 | Lehnert | 251/261 X |
| 2,313,232 | 3/1943 | Freeman | 251/138 X |
| 2,762,000 | 9/1956 | Matthews | 251/138 X |
| 3,038,487 | 6/1962 | Gardner | 251/363 X |
| 3,074,425 | 1/1963 | Kikendall | 251/332 X |

FOREIGN PATENTS

| 147,406 | 10/1962 | U.S.S.R. | 137/636.1 |

Primary Examiner—M. Cary Nelson
Assistant Examiner—Robert J. Miller
Attorney—Wheeler, Wheeler, House & Clemency ABSTRACT: Disclosed herein is a solenoid actuated valve having a slide block or plunger containing a resilient plastic sealing insert and moved by an eccentric cam into sealing engagement with an externally adjustable valve plug having a valve seat to control flow in passages whose arrangement is optional and O-ring seals to seal the valve plug in said passages.

PATENTED AUG 31 1971

Inventors
Raymond H. Boehm
George L. Boehm
By
Wheler, Wheeler, House & Clemency
Attorneys

SOLENOID VALVE

BACKGROUND OF THE INVENTION

This invention relates to solenoid actuated valves of the type having a plunger moveable into engagement with a valve seat in a flow passage. The armature of a solenoid is often used as the plunger and is biased into engagement with one valve seat and moved on energizing the solenoid coil into engagement with another valve seat located a spaced distance from the first valve seat. No provision is made in these valves for an externally accessible adjustment of the stroke of the plunger nor to compensate for wear of the valve surfaces. They do not permit the high flow of the instant valve, nor seal bubble tight at high pressures.

SUMMARY OF THE INVENTION

The solenoid valve of the present invention provides positive motion for a plunger between externally axially adjustable valve plugs. Positive movement of the plunger is accomplished by using an eccentric cam to move the plunger selectively into engagement with either valve seat. A bubble tight seal is provided between the plunger and the valve plugs by positioning resilient plastic inserts in each end of the plunger to engage the valve plugs. The bubble tight feature is also enhanced by the high actuating force obtainable from the cam, and its high resistance to displacement despite relatively low force obtainable from the solenoid. Moreover, the external adjustment permits the sealing point to be adjusted to maximum effectiveness, if necessary, without disassembly or even removing the valve from service. The seal has been found to be leak proof at pressures in excess of 600 p.s.i. for periods of at least a week. The valve plugs each have a valve seat of smaller cross section than the cross section of the inserts in the ends of the plungers. The valve plugs can be adjusted in the flow passage to vary the stroke of the plunger and to compensate for wear without the necessity of making any seal adjustments. The valve body is so shaped as to be usable without change as the end plate of a device containing working fluid, such as an accumulator.

Other objects and advantages will become apparent from the following detailed description when read in connection with the accompanying drawings, in which:

FIG. 4 is a view of a valve plug modified to include an adjustable flow restrictor.

DESCRIPTION OF THE INVENTION

Although the disclosure hereof is detailed and exact to enable those skilled in the art to practice the invention the physical embodiments herein disclosed merely exemplify the invention which may be embodied in other specific structure. The scope of the invention is defined in the claims appended hereto.

Figure 1:
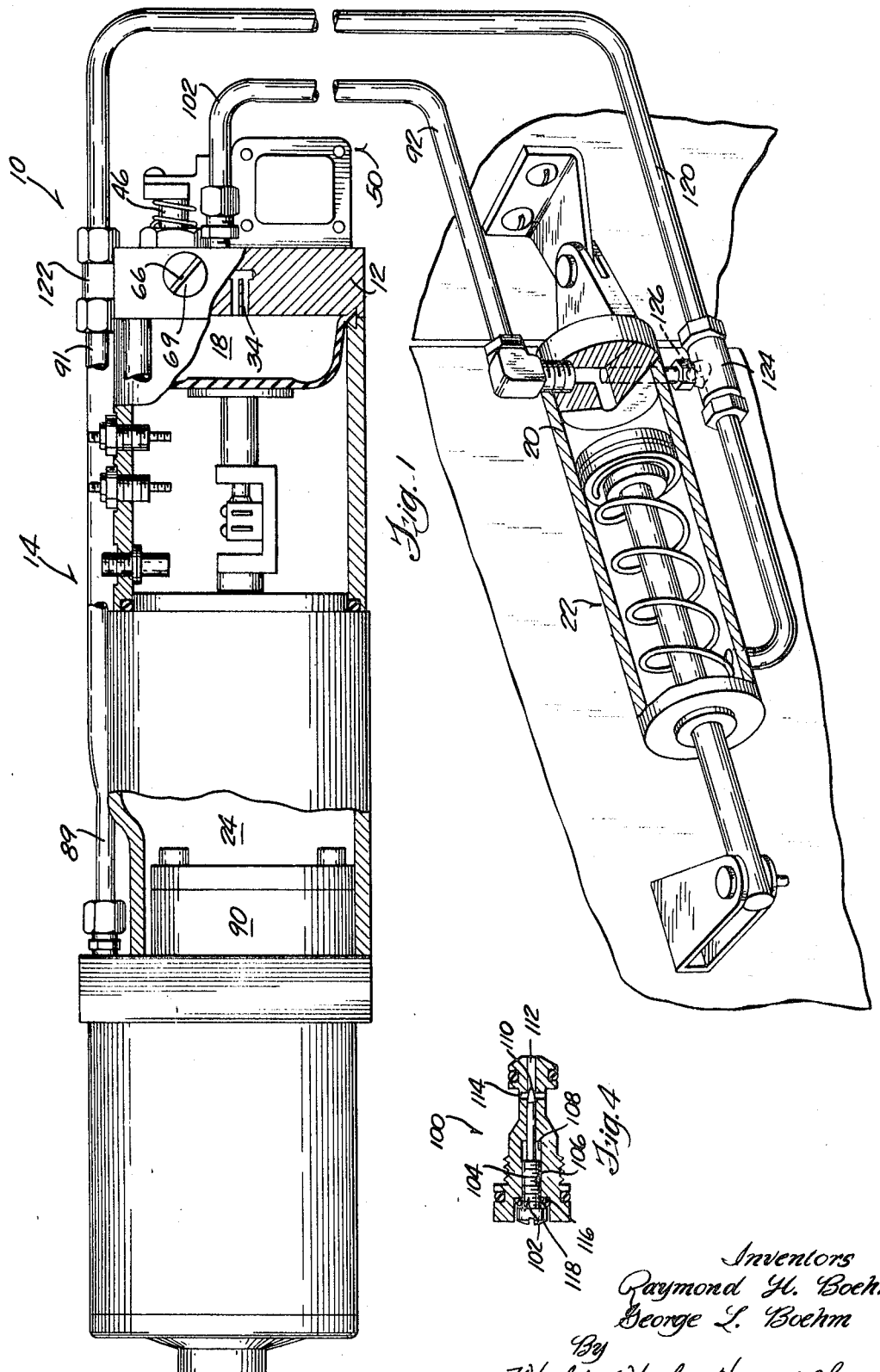
FIG. 1 is an end view of a hydraulic accumulator for a door opener with the solenoid valve incorporated in the end plate of the accumulator.

Referring more specifically to FIG. 1 of the drawing, the solenoid valve 10 is shown incorporated in the end wall 12 of a hydraulic accumulator 14. In a device of this type, the solenoid valve 10 is used to control the discharge of a high pressure fluid charge from an accumulator chamber 18 to a cylinder 20 for a hydraulic door actuator 22 and the return of the fluid charge from the cylinder 20 to the reservoir 24 in the accumulator 14. The operation of the accumulator and door actuator is shown and described in our copending application, now Pat. No. 3,534,500, and no further description is required here other than to point out that in a device of this type positive opening and closing of the valves is required due to the high pressure of the fluid being controlled and to provide satisfactory opening and closing motion for the door. This use of the solenoid valve 10 is shown by way of example only since the solenoid valve can be used to control the flow of fluid for many devices, using the same or different passage arrangements.

Figure 2:
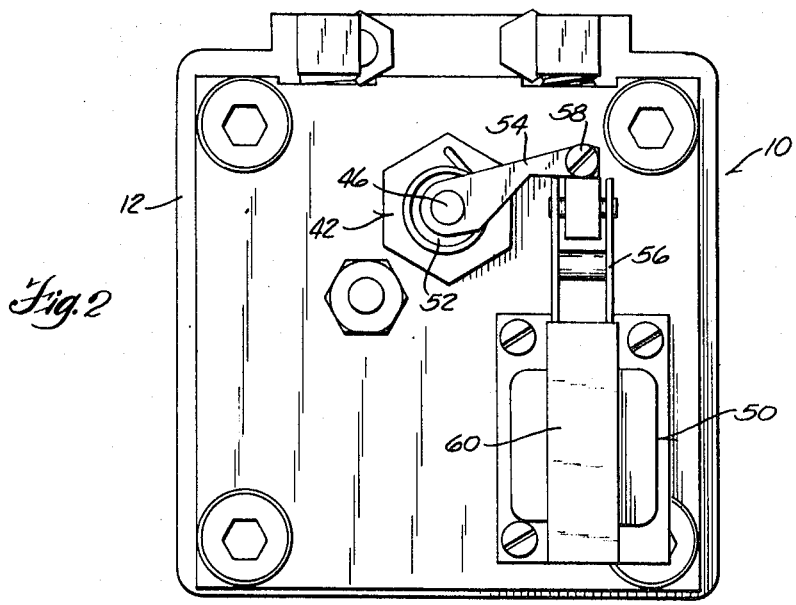
FIG. 2 is a view in section of the end plate of the accumulator showing the valve members in the flow passages in the end plate.
Figure 3:
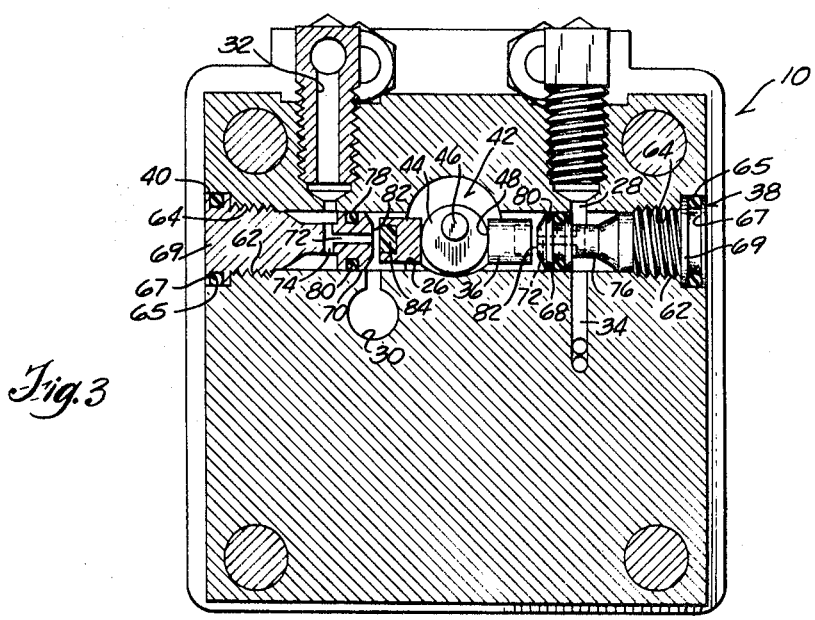
FIG. 3 is a view partly in section of the accumulator connected to a hydraulic door actuator.

Referring to FIGS. 2 and 3, the end wall 12 which forms the housing for the solenoid valve 10 is provided with a main bore or passage 26, an inlet passage 28, an outlet passage 30 and a return passage 32. A flow passage 34 is also provided from the main bore 26 to the accumulator chamber 18. The flow of fluid through the main passage 26 is controlled by means of a closure member 36 such as a square slide block or plunger which is moveable into engagement with valve plugs 38 and 40 located at opposite ends of passage 26. The closure member 36 is moved into engagement with the valve plugs 38 an 40 by means of an eccentric cam assembly 42 to close the flow path between passage 28 and outlet passage 30 and open the flow path between the outlet passage 30 to the return passage 32 or to close the flow path between the outlet passage 30 and the return passage 32 and open the flow path between the inlet passage 28 and the outlet passage 30.

In this last regard, the cam assembly 42 includes an eccentric cam 44 mounted on a shaft 46 and positioned in a recess 48 in the slide block 36. The cam 44 is rotated to move the closure member 36 by means of a solenoid 50 against the bias of a spring 52. More specifically, a radial arm 54 is secured to the shaft 46 and is biased by means of the spring 52 to rotate the shaft in a counterclockwise direction as seen in FIG. 2. The shaft 46 is rotated in a clockwise direction by means of the solenoid 50 which has an armature 56 connected to the outer end of the radial arm 54 by a bolt 58. When the solenoid coil 60 is energized, the armature 56 will be pulled downward against the bias of spring 52 rotating the eccentric cam 44 clockwise and moving the slide block 36 to the left in FIG. 3 against valve plug 40. When the coil 60 is deenergized, the spring 52 will rotate the shaft counterclockwise moving the slide block 36 to the right against the valve plug 38. Although an eccentric cam has been shown to provide the closing force for the closure member 36, other mechanical movements can be used as long as the holding force is applied in a direction in which the mechanical device cannot yield.

The stroke of the plunger 36 and the rotation of cam 44 can be adjusted by adjusting the axial position of the valve plugs within the main bore 26. This adjustment is made externally of the housing by providing a threaded section 62 on each of the valve plugs 38 and 40 and a threaded section 64 at each end of the flow passage 26. Slots 66 or other conventional means are provided in each of the valve plugs 38 and 40 so that they can be rotated to move the valve plugs axially within the bore 26. The valve plugs 38 and 40 are sealed in the bore 26 by means of O-ring seals 65 provided in grooves 67 in the heads 69 of the plugs. This adjustment can be made while the valve is under pressure since the seal is not broken by the movement of the valve plug. By proper design of cam 44 this adjustment may be used to control the force available to resist leakage, as well as to control the time during which both valves are open, if any.

The flow of fluid through the main passage 26 is controlled by positioning the valve head 68 of valve plug 38 between the inlet passage 28 and outlet passage 30 and the valve head 70 of valve plug 40 between the outlet passage 30 and return passage 32. Fluid flows through an axial orifice 72 in each of the valve heads 68 and 70 which is connected to a cross bore 74 in a reduced diameter section 76 of the valve plugs. The valve heads 68 and 70 are sealed in the passage 26 by means of an O-ring 78 provided in a groove 80 on the outer periphery of the valve head.

The flow of fluid through the valve heads 68 and 70 is controlled by the engagement of the slide block 36 with the valve seats 82 provided at the end of the valve plugs. A bubble tight seal is produced between the plunger 36 and the valve seats 82 by means of a resilient plastic insert 84 seated in an aperture 86 at each end of the slide block 36. The inserts 84 each have a cross sectional area larger than the cross sectional area of valve seats 82, and are made of a plastic material such as Teflon (tetrafluroethylene) or any other plastic material which is compatible with the fluid being controlled. By moving the slide block 36 against the valve seat 82 by a positive motion, a bubble tight seal will be formed at the end of the orifices 72 in the valve plugs. At the same time, this arrangement gives unobstructed flow when the valve is open, limited only by passage size. This is unusual in a bubble tight solenoid valve.

When the solenoid valve is used in conjunction with a hydraulic accumulator as shown in FIG. 1, the inlet 28 is connected to the pump 90 in the reservoir 24 by a tube 89 and the return passage 32 is connected directly to the reservoir 24 through a tube 91. The outlet passage 30 is connected to the flow line 92 to the cylinder 20 and the flow passage 34 is connected directly to the accumulator chamber 18. The plunger 36 is normally biased by the spring 52 into engagement with the valve plug 38 to close the flow path between the inlet passage 28 and the outlet passage 30. When the plunger 36 is in this position, the pump 90 will fill the accumulator chamber 18 with a charge of fluid at a pressure which is sufficient to operate the door opener, for instance 500 p.s.i. The solenoid coil 60 is energized to pull the armature 56 into the coil and rotate the shaft 46 clockwise to move the plunger 36 into engagement with the valve plug 40. Fluid from the accumulator chamber 18 or pump 90 can then flow through the cross bore 74 and orifice 72 in valve plug 38 past the plunger 36 and out through the outlet passage 30 to actuate the hydraulic actuator 22 and open the door. When the coil 60 is deenergized, the spring 52 will rotate the shaft counterclockwise moving the plunger 36 into engagement with valve plug 40 and opening the flow path from the outlet passage 30 to the return passage 32.

If the door is to be operated manually, a return tube 120 should be provided between the front of cylinder 20 and the return line 91 to prevent slamming of the door due to the creation of a vacuum in the cylinder when the door is opened. The return tube 120 is connected to a T-fitting 122 connected between return line 91 and passage 32 to provide an open flow path between the front of the cylinder 20 and the back of the cylinder 20. This flow path includes tube 120, passage 32, and flow line 92. If a direct connection is required between the front and rear of cylinder 20, a second T-fitting 124 may be connected to return tube 120 and to the rear of cylinder 20. A one way check valve 126 is provided in T-fitting 124 to prevent the flow of fluid under pressure from the rear of cylinder 20 into the return tube 120 when the door is operated hydraulically. A one way check valve should also be provided in tube 89 to prevent back flow from accumulator 18 to the pump 90. Both of these one way check valves may be of the type shown in Pat. application Ser. No. 782,632, or any other suitable type. The interconnection between the ends of the cylinder is useful to permit manual operation of the door in the event that the mechanism fails.

In some instances, it may be necessary to adjustably restrict the flow of fluid in the inlet passage or the outlet passage to delay the opening or closing of the door. This can be accomplished by modifying the valve plug 100 shown in FIG. 4 to include an adjustable needle valve 102. Adjustment of the needle valve 102 is accomplished by means of a threaded section 104 on the needle valve 102 and a threaded section 106 in orifice 108 in the valve plug 100. The needle valve 102 is rotated to move the tip 110 into or out of the junction of orifice 112 and cross bore 114 producing a restricted flow path. The orifice 108 is sealed by means of an O-ring seal 116 provided adjacent the head 118 of the needle valve 102.

If greater flexibility of valving arrangements is needed, a second solenoid valve 10 could be provided in the end wall 12 with a separate solenoid to control the valve member. The second solenoid can be arranged to operate simultaneously with or independently of the first solenoid to provide a multiple number of operations.

It will be understood that although my novel valve and valve body are illustrated in a door operator, they have general application in other devices.

What is claimed is:

1. A solenoid valve comprising
a housing,
a valve passage in said housing,
a valve seat in said passage,
means carrying said valve seat and externally adjustable to vary the position valve seat in said passage,
said means carrying said valve seat being provided with a needle valve adapted to control the flow through said valve seat,
a closure member positioned to engage said valve seat and close said passage,
a cam to move said member into engagement with said valve seat,
and a solenoid operatively connected to move said cam.

2. A solenoid valve according to claim 1 wherein said cam is mounted for rotary motion in said housing.

3. A solenoid valve according to claim 1 wherein said closure member includes a recess to receive said cam, said recess having cam follower surfaces at both ends.

4. A solenoid valve according to claim 1 wherein said closure member includes a plastic insert to sealingly engage said valve seat.

5. A solenoid valve comprising
a valve body having a passage, valve plugs in said passage
a slide block positioned between said valve plugs,
a cam positioned to engage said slide block and
a solenoid operatively connected to said cam to move said block into sealing engagement with said valve plugs, said valve plugs being externally adjustable in said passage.

6. A valve according to claim 5 including means to bias said block into engagement with one of said valve plugs, said solenoid being adapted to rotate said cam and move said block to engage another of said valve plugs.

7. A solenoid valve according to claim 5 wherein said block includes a resilient plastic insert in each end to engage said valve plugs.

8. A solenoid valve according to claim 7 wherein said plastic insert is made of Teflon 9. A solenoid valve according to claim 5 wherein said block includes a recess to receive said cam.

10. A solenoid valve according to claim 7 wherein said inserts have a larger cross sectional area than the area of engagement of said valve plugs.

11. A solenoid valve according to claim 5 wherein said valve plugs include O-ring seals to seal said plugs in said passage.

12. A solenoid valve according to claim 5 including means to restrict the flow of fluid through one of said valve plugs.

13. A solenoid valve comprising
a valve body having a passage, valve plugs in said passage,
a slide block positioned between said valve plugs,
a cam positioned to engage said slide block and,
a solenoid operatively connected to said cam to move said block into sealing engagement with said valve plugs,
means to restrict the flow of fluid through one of said valve plugs including a needle valve threadedly mounted in said valve plug.

14. A solenoid valve according to claim 5 wherein said valve plugs are externally adjustable in said passages and include O-ring seals to seal said plugs in said passage,
said solenoid being adapted to rotate said cam to move said block to engage another of said valve plugs,
said block including a recess to receive said cam and a Teflon insert at each end to engage said valve plugs, said inserts having a larger cross sectional area than the area of engagement of said valve plugs and
means to bias said block into engagement with one of said valve plugs.

15. A solenoid valve according to claim 14 including a needle valve threadably mounted in said valve plug to restrict the flow of fluid through one of said plugs.

16. A solenoid valve according to claim 5
said valve body being adapted to be secured to a housing containing hydraulic fluid to serve as an end cap for said housing.